(12) United States Patent
Corcoran

(10) Patent No.: US 6,371,406 B1
(45) Date of Patent: Apr. 16, 2002

(54) PROGRESSIVE 3-AXIS MULTI-VARIABLE PROPULSION VECTORING AERIAL AND SPACECRAFT VEHICLE

(76) Inventor: Bruce Alan Corcoran, 4342 Hadley Ave. N., Oakdale, MN (US) 55128

( * ) Notice: Subject to any disclaimer, the term of this patent is extended or adjusted under 35 U.S.C. 154(b) by 0 days.

(21) Appl. No.: 09/444,491

(22) Filed: Nov. 19, 1999

(51) Int. Cl.[7] .............................................. B64C 39/06
(52) U.S. Cl. ...................... 244/12.2; 244/23 C; 244/52
(58) Field of Search ............................... 244/12.2, 12.3, 244/12.4, 23 R, 23 C, 52

(56) References Cited

U.S. PATENT DOCUMENTS

| | | | | |
|---|---|---|---|---|
| 2,947,496 A | * | 8/1960 | Leggett | 244/12.2 |
| 2,988,303 A | * | 6/1961 | Coanda | 244/23 C |
| 3,020,003 A | * | 2/1962 | Frost et al. | 244/23 C |
| 3,955,784 A | * | 5/1976 | Salkeld | 244/62 |
| 4,023,751 A | | 5/1977 | Richard | |
| 4,049,218 A | | 9/1977 | Wen | |
| 4,193,568 A | * | 3/1980 | Heuvel | 244/23 C |
| 4,387,867 A | | 6/1983 | Jordan | |
| 4,461,436 A | | 7/1984 | Messina | |
| 4,773,618 A | * | 9/1988 | Ow | 244/23 C |
| 4,824,048 A | | 4/1989 | Kim | |
| 4,955,962 A | | 9/1990 | Mell | 244/23 C |
| 5,106,035 A | * | 4/1992 | Langford, III | 244/59 |
| 5,251,855 A | | 10/1993 | Kaelsch | |
| 5,421,538 A | | 6/1995 | Vassa | |
| 5,507,453 A | | 4/1996 | Shapery | |
| 5,881,970 A | * | 3/1999 | Whitesides | 244/12.2 |
| 5,895,011 A | | 4/1999 | Gubin | |

FOREIGN PATENT DOCUMENTS

DE       1102564     *   3/1961   ................ 244/12.2

OTHER PUBLICATIONS

Anderton, "LACE concept feasibility proof sought", Aviation Week and Space Tech. pp 59 and 63, Nov. 6, 1961.*

* cited by examiner

Primary Examiner—Galen L. Barefoot
(74) Attorney, Agent, or Firm—Schwegman, Lundberg, Woessner & Kluth, P.A.

(57) ABSTRACT

The present embodiments and associated methods provide for a progressive 3-axis multi-variable propulsion vectoring aerial and spaceborne vehicle. One embodiment of the vehicle is comprised of top and side air intakes, a curved sphenoid air accumulator, a compressor section, a diffuser, a plurality of fuel burner cans, a turbine section, a gas plenum, top, side, and bottom exhaust ports, propellant burner cans, gas plenum iris, an onboard flight control computer, and top, side, and bottom exhaust port doors. Combustion gasses are produced which are directed by the gas plenum to the exhaust ports which provide thrust and lift to the vehicle. By selectively opening and closing the exhaust port doors, the vehicle may be made to rise, hover, and accelerate in any direction. Such an embodiment provides a vehicle that can directly ascend through the atmosphere into space.

37 Claims, 13 Drawing Sheets

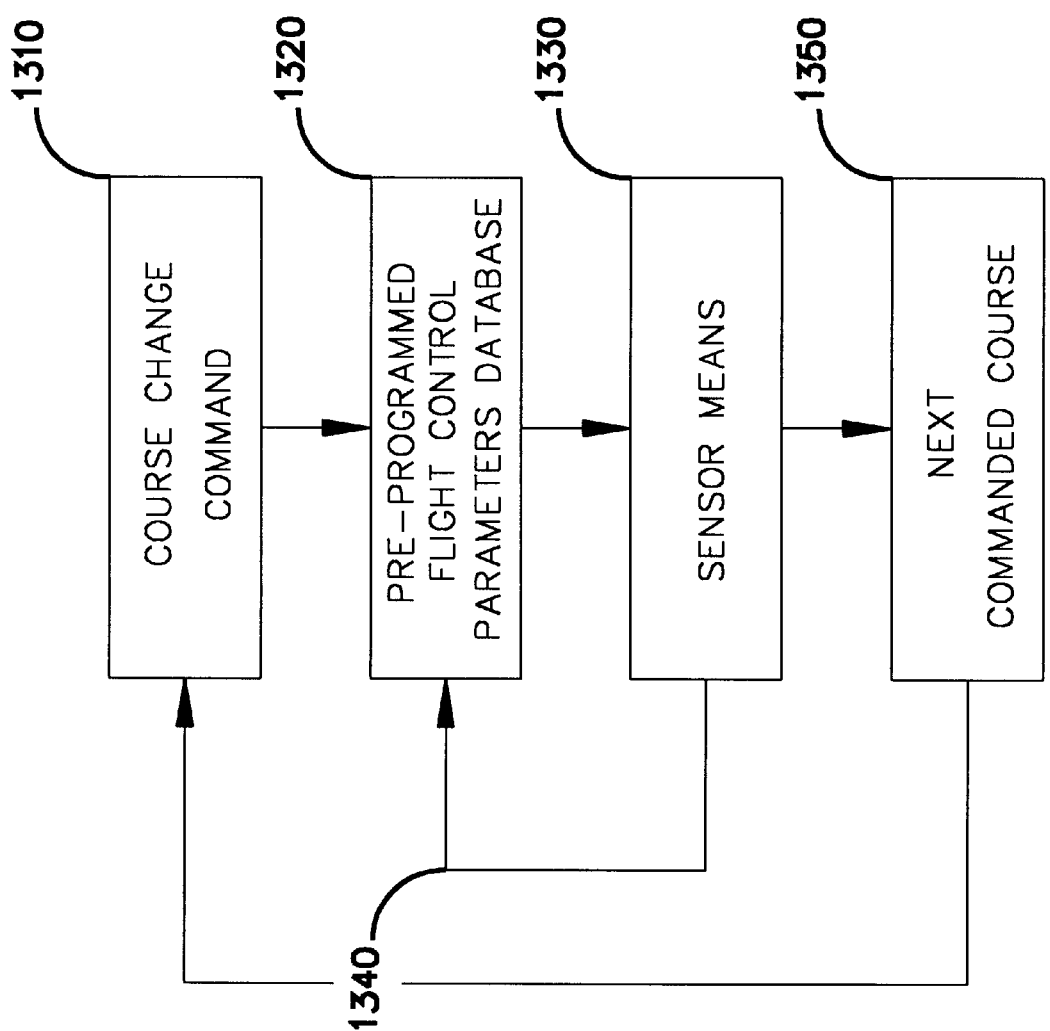

PROGRESSIVE 3-AXIS MULTI-VARIABLE PROPULSION VECTORING AERIAL AND SPACECRAFT VEHICLE

TECHNICAL FIELD

The present description generally relates to a vehicle capable of flight and, more particularly, to an aircraft with vertical takeoff and landing and high maneuverability characteristics which can be operated inside and outside of Earth's atmosphere.

BACKGROUND

Throughout the history of aeronautics and astronautics, designers have been trying to develop a vehicle with vertical takeoff and landing (VTOL) capability and ability to quickly effect course changes. Various designs have been proposed to achieve these operating characteristics, such as the helicopter and traditional fixed-wing aircraft with vectored thrust propulsion systems. Helicopters provide VTOL characteristics via a very large exposed rotor blade assembly. Horizontal flight is achieved by varying the rotor blade pitch which provides a relatively inefficient forward thrust. Maneuverability is limited to relatively wide turns and ascents/descents. There is no provision for flight in the reverse direction.

Fixed-wing VTOL aircraft provide their VTOL characteristics via redirecting the thrust provided by one or more power plants. The thrust may be redirected using deflection veins or by tilting the power plant on an axis. Horizontal flight is achieved by transitioning the vectored thrust from the vertical deflection to the horizontal or by rotating the engine from the vertical to the horizontal. Rearward thrust is produced to provide forward flight with the aerodynamic control surfaces providing the lift. Maneuverability is limited to relatively wide turns and ascent/descents. Reverse flight is not provided.

Designers have tried to impart VTOL characteristics to saucer-shaped aircraft.

VTOL characteristics are generally provided by one or more vertically positioned engines such that the engine thrust is directed towards the ground. Horizontal thrust is provided through a second propulsion system. Saucer-shaped aircraft are generally unstable in both vertical and horizontal flight. Stability is controlled via gyroscopic devices. Little success has been made in developing a viable saucer-shaped aircraft.

The advantages of VTOL and highly maneuverable aircraft are obvious. VTOL characteristics allow for the aircraft to land and take off in a very limited space. High maneuverability is especially advantageous for military applications. There is a need in the art to develop a vehicle that has VTOL characteristics and to be highly maneuverable in flight. Highly maneuverable is defined as essentially instantaneous course changes in all three frames of reference, including reverse. Such maneuvers include small radius turns, zig-zag, and high speed reverse. There is also a need for such a vehicle to operate in both air and/or space environments.

BRIEF DESCRIPTION OF THE DRAWINGS

FIG. 13 is a flow diagram of an embodiment of a flight control system.

DETAILED DESCRIPTION

Figure 1:
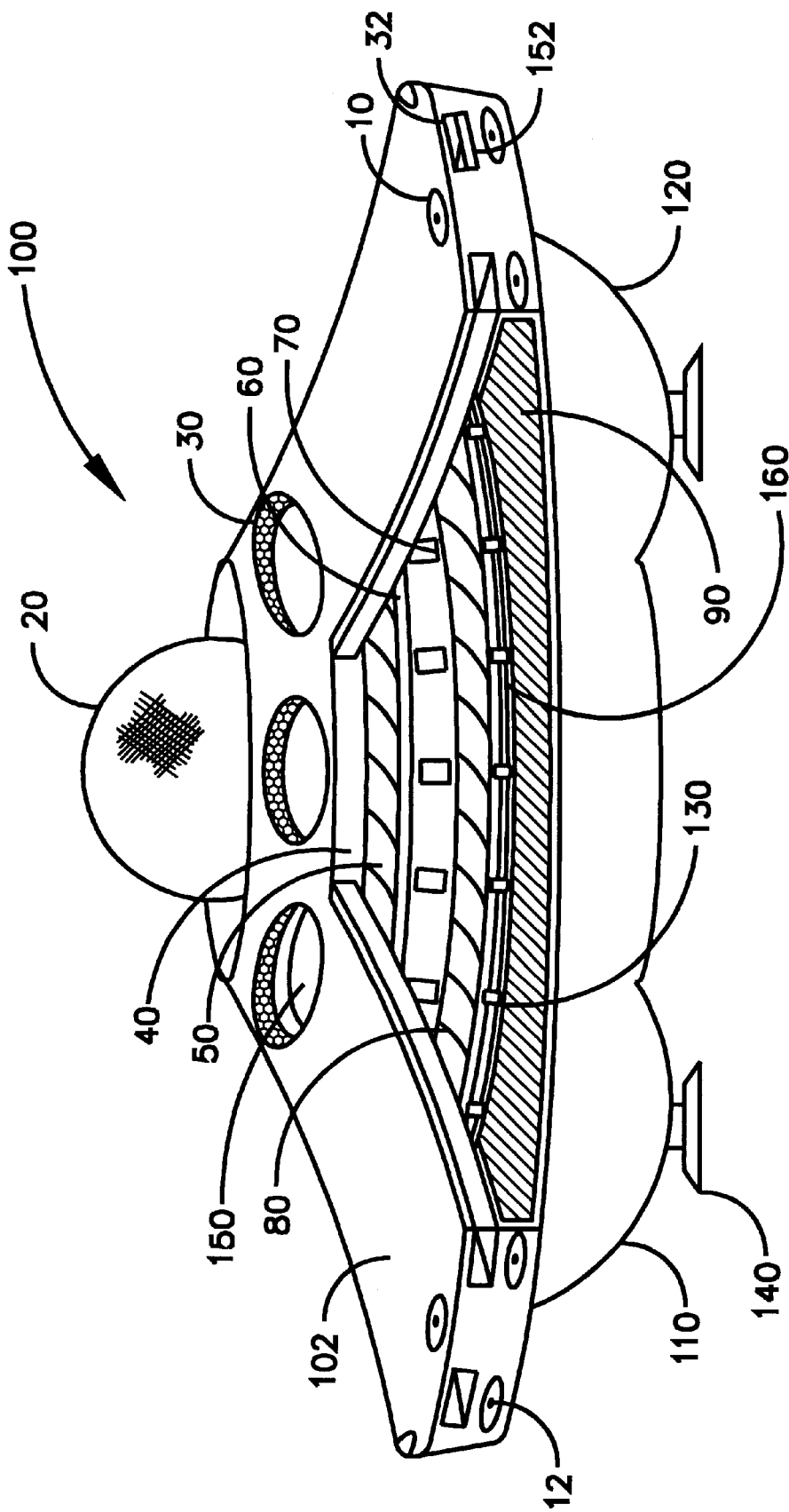
FIG. 1 is a perspective, cut-away view of an embodiment of a vehicle.

In the following detailed description, reference is made to the accompanying drawings, which are not necessarily to scale, which form a part hereof, and in which is shown by way of illustrating specific embodiments in which the apparatus may be practiced. These embodiments are described in sufficient detail to enable those skilled in the art to practice them, and it is to be understood that the embodiments may be combined, or that other embodiments may be utilized and that structural changes may be made without departing from the spirit and scope. The following detailed description is, therefore, not to be taken in a limiting sense, and the scope is defined by the appended claims and their equivalents. In the drawings, like numerals describe substantially similar components throughout the several views.

The present embodiments will be described in applications involving air and space flight. However, it is understood that the present embodiments may be employed in applications involving only air or space flight, depending on how the thrust is produced. Further, in the embodiments presented below, the propulsion system is mounted in the vehicle in a generally vertical configuration. Other configurations, such as horizontal, are also within the scope of this disclosure. Other methods of gas generation providing thrust is also considered within the scope of this disclosure. Additionally, an unmanned vehicle with or without a passenger compartment is also within the scope of this disclosure.

FIG. 1 presents a perspective cut-away view of an embodiment of a progressive 3-axis multi-variable propulsion vectoring aerial and spaceborne vehicle 100. The vehicle 100 is comprised of an airframe 102; a passenger compartment 20; top and side air intakes 30 and 32, respectively; a curved sphenoid air accumulator 40; compressor section 50; a diffuser 60; a plurality of fuel burner cans 70; turbine section 80; a gas plenum 90; top, side, and bottom (not shown) exhaust ports 10, 12, 14, respectively; fuel tank 10; propellant tank 120; propellant burner cans 130; landing gear 140; top and side air intake doors 150 and 152, respectively; gas plenum door 160; an onboard flight control computer (not shown); and top, side, and bottom exhaust port doors 11, 13, and 15, respectively (not shown).

For atmospheric flight, the vehicle 100 takes in air through the air intakes 30 and 32 by opening the air intake doors 150 and 152, respectively. Air is allowed to accumulate in the curved accumulator sphenoid 40. The air is compressed by the compressor section 50 and allowed to achieve optimum compression in the diffuser 60. The high pressure air is mixed with fuel supplied from the fuel tank 110 and ignited in the fuel burner cans 70. The fuel can be any type of fuel used in air breathing engines, such as jet fuel, kerosene, gasoline, among others. The heated high pressure gas expands through turbine 80. The gas plenum door 160 is opened to allow the hot expanding gasses to enter the gas plenum 90. The gas plenum 90 directs the hot gas to the exhaust ports 10, 12, and 14 (not shown). Selectively controlling the gas through each of the plurality of exhaust ports 10, 12, and 14 results in a stable flight configuration.

In one embodiment, the exhaust ports are located near the perimeter of the vehicle 100 along the top, side, and bottom. Such an arrangement is more stable and leads to better maneuverability than if the exhaust ports are closer to the vehicle's center portion.

Figure 4:
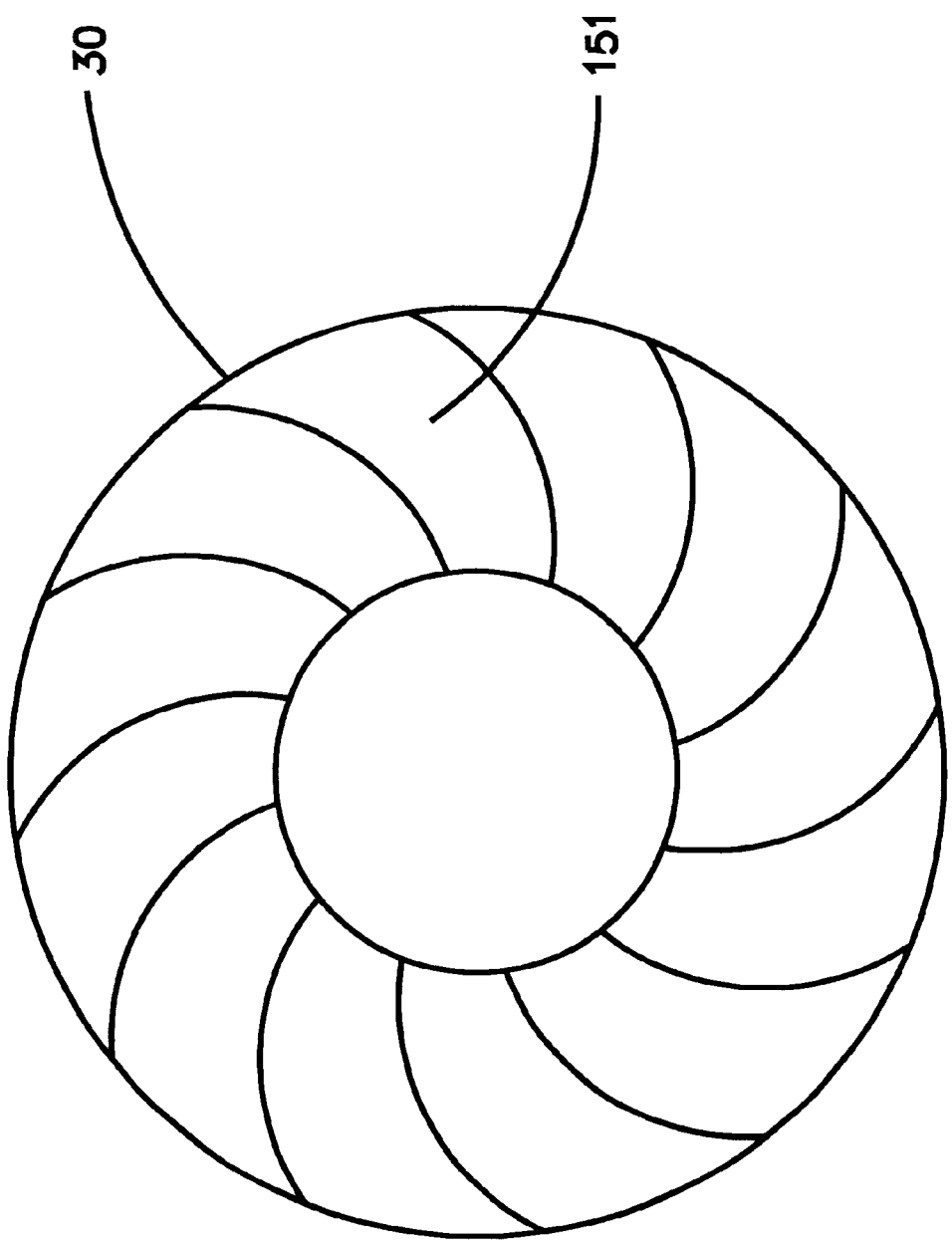
FIG. 4 is a front view of an embodiment of the iris "door".

The top and side air intakes, 30 and 32, respectively, as well as the top, side, and bottom exhaust ports 10, 12, and 14, respectively, require a means to control the aperture size. In one embodiment, top and side sliding air intake doors 150 and 152, respectively, are provided. The doors slide from fully closed to fully open depending on the vehicle 100 flight configuration. In other embodiments, means to control the aperture size may include an iris-type of door such as that shown in FIG. 4. Similarly, the top, side, and bottom exhaust ports, 10, 12, and 14, respectively, require a means to control aperture size such as with a sliding door or iris.

Figure 2:
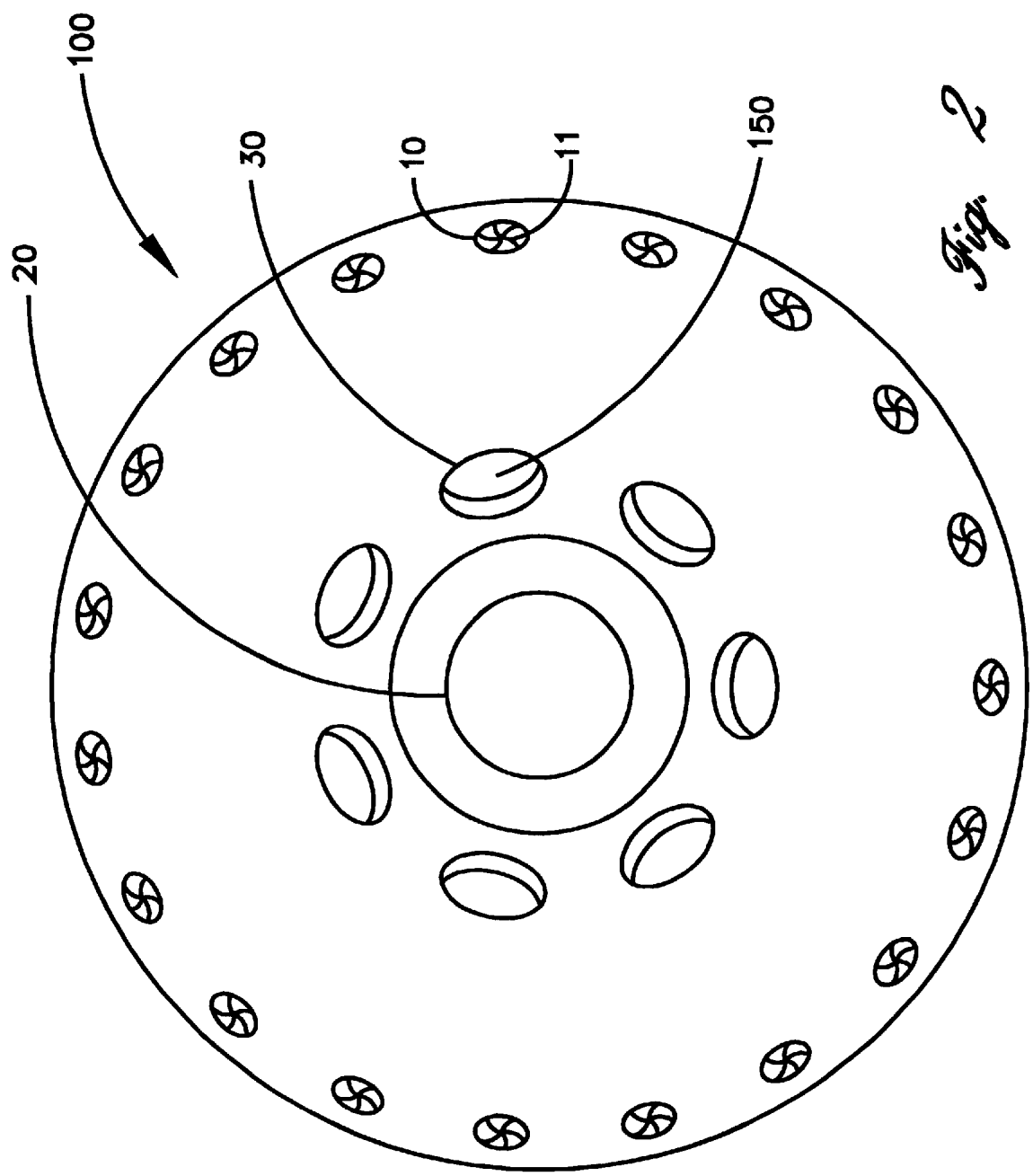
FIG. 2 is a top view of an embodiment of a vehicle.
Figure 3:
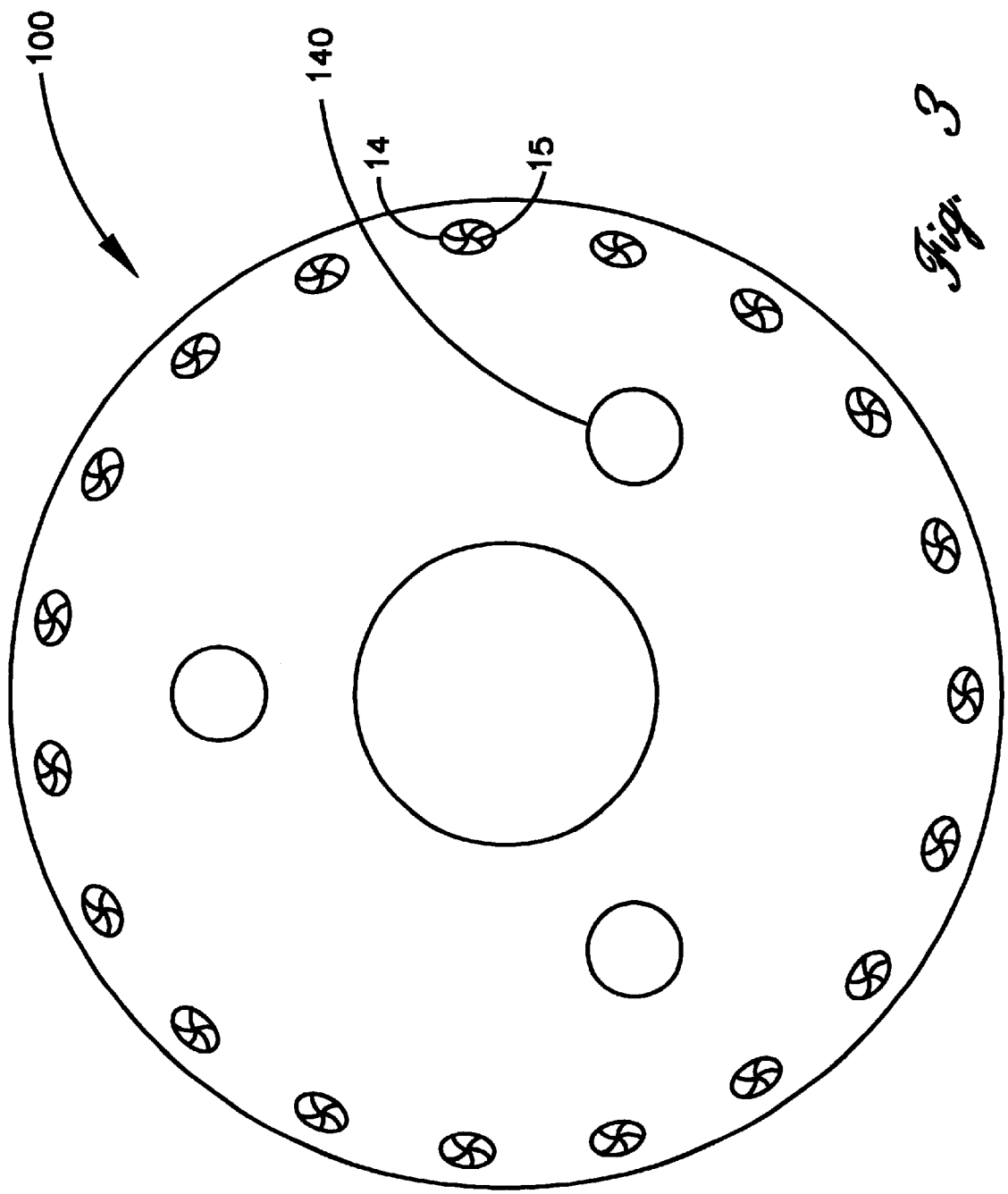
FIG. 3 is a bottom view of an embodiment of a vehicle.

FIG. 2 shows a top view of an embodiment of a progressive 3-axis multi-variable propulsion vectoring aerial and spaceborne vehicle 100 showing the placement of the passenger compartment 20, top air intakes 30, and top exhaust ports 10 and top exhaust port doors 11. FIG. 3 shows a bottom view of an embodiment of a progressive 3-axis multi-variable propulsion vectoring aerial and spaceborne vehicle 100 showing the placement of the bottom exhaust ports 14, bottom exhaust port door 15, and the landing gear 140. In this embodiment, vehicle 100 is circular in shape. The shape of a cross-section parallel to the axis of the circle may be in the form of an airfoil. Such a configuration will provide aerodynamic lift when the vehicle is traveling in a direction other than strictly vertically. Since the vehicle 100 is symmetric about a central axis, the vehicle 100 will have the same aerodynamic efficiency whether traveling forward, back, or sideways. This characteristic contributes to the vehicle 100 being highly maneuverable in any direction of travel.

Figure 5:
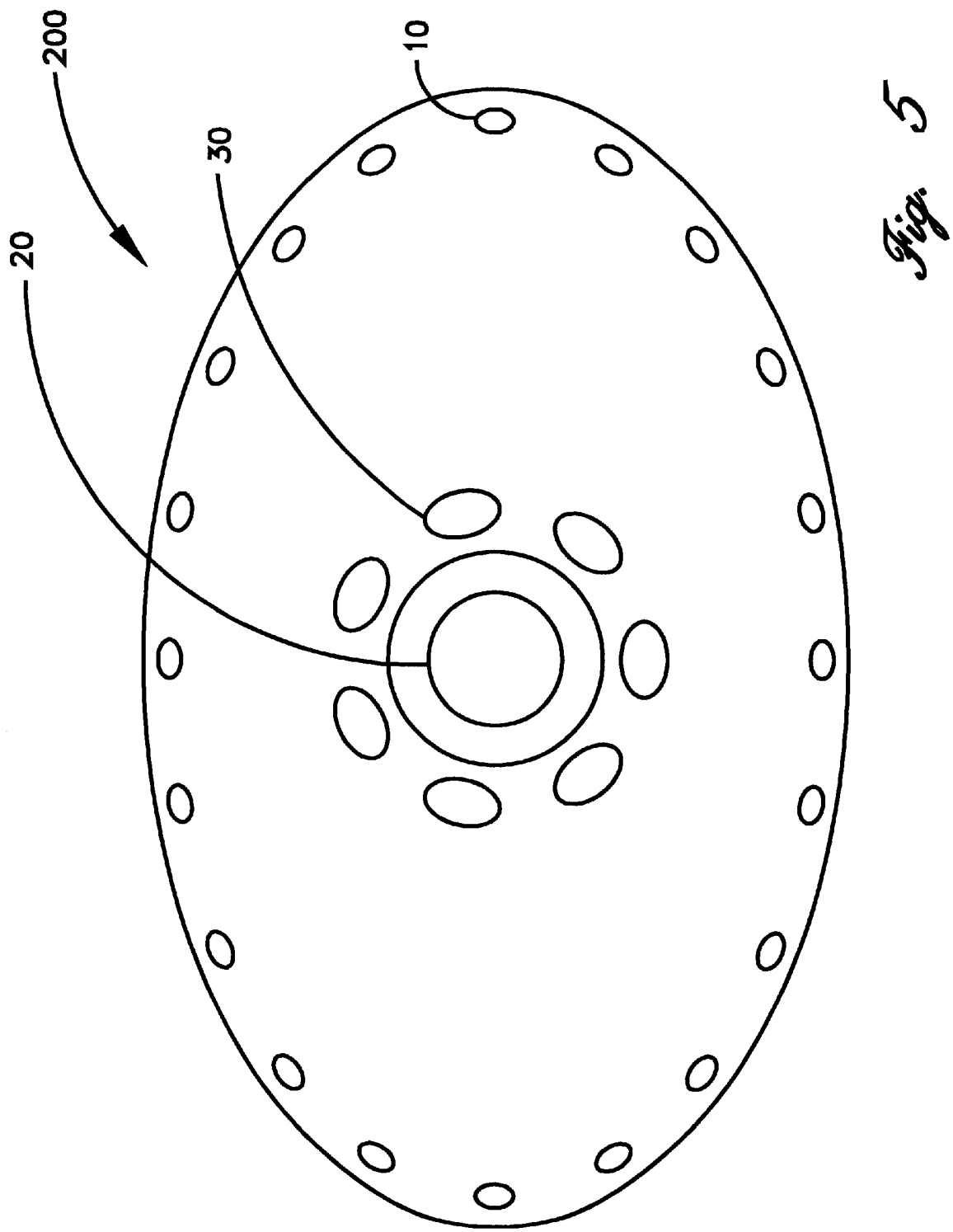
FIG. 5 is a top view of an embodiment of a vehicle comprising an oval shape.

FIG. 5 shows a top view of another embodiment of a progressive 3-axis multi-variable propulsion vectoring aerial and spaceborne vehicle 200 showing the placement of the passenger compartment 20, top air intakes 30, and top exhaust ports 10. Vehicle 200 has a generally oval shape which is more "wing-shaped" which is advantageous for vehicles requiring more efficient forward and reverse flight configurations at the sacrifice of side to side flight. In forward or reverse flight, the vehicle 100 will travel with its major axis perpendicular to the direction of flight. The vehicle's 100 cross-sectional shape parallel to the minor axis may have the shape characteristic of an airfoil to take advantage of the lift such a configuration would provide.

Referring to FIG. 1, vehicle 100 rests on the ground setting upon the landing gear 140. In order to take off from the ground, the bottom (ground-facing) exhaust port doors (not shown) around the periphery of the vehicle are opened while all remaining exhaust port doors are closed. The fuel is throttled into the fuel burner cans 70 to create hot expanding gases which are exhausted through the open exhaust ports 14. Throttling of the fuel controls the amount of exhaust gasses and thus the thrust. The thrust of the exhaust gas causes the vehicle 100 to raise off the ground. As the vehicle 100 climbs vertically, the onboard flight control computer controls the partial or full opening and closing of the exhaust port doors around the sides and top periphery of the vehicle 100 to counteract any instabilities caused by wind or inertial events. As the vehicle 100 is commanded to transition from vertical to horizontal flight, the exhaust port doors are opened on the side opposite the direction of intended flight while the bottom exhaust port doors remain open. As horizontal speed is increased, the vehicle's airfoil shape takes some of the aerodynamic loading to produce lift, reducing the need for the bottom exhaust ports 14 to provide the lifting thrust. An onboard flight control computer will command the bottom exhaust port doors to partially or fully close. While in flight, stability is maintained by the flight control computer which will continuously adjust exhaust port door 11, 13 and 15 opening. Redundancy in exhaust ports 10, 12 and 14 will allow for control of the vehicle in the event of exhaust port door failure.

Exhaust ports 10, 12, and 14 are provided on the bottom, sides and top, respectively, of the vehicle 100. Maneuverability is controlled by selective exhaust port opening and closing. For maneuvers such as rapid transition from horizontal flight to a descent, exhaust port doors along the top periphery of the vehicle 100 are commanded to open by the onboard flight control computer to augment the vehicle's descent. Maneuvers such as rapid flight reversal may be achieved by a controlled sequence of exhaust port door opening and closing such that thrust is produced 180 degrees from the direction of flight and altitude is maintained by controlling the bottom exhaust ports 14.

In order for the vehicle 100 to transition from air to space flight, a transition from the use of fuel suitable for air-breathing propulsion systems to a fuel-oxidizer propellant is made. The fuel-oxidizer propellant may be any propellant that is used in a space environment, such as hydrogen-oxygen, hydrazine, aerozine, among others. As the fuel burner cans 70 are shut down, the air intake doors 150 and 152 are closed, and the gas plenum door 160 separating the turbine section 80 from the propellant burner cans 130 is closed to prevent hot gasses from entering the turbine section 80. The gas plenum door 160 may be in the configuration of a series of sliding doors, an iris configuration like that of the exhaust doors, among other configurations. The propellant burner cans 130 are ignited with propellent supplied from propellant tank 120. The propellant is throttled through the propellant burner cans 130. The gas from the propellant burner cans accumulates in the gas plenum 90 for exhausting through the exhaust ports. Flight control is maintained by the computer controlling the selective opening and closing of exhaust ports 10, 12, and 14 based on the desired flight course. This transition is reversed upon entering the atmosphere.

Conventional space-borne rockets are designed for launch into a high speed ballistic arc to achieve orbital velocity of 17,500 miles per hour. In contrast, a direct vertical ascent trajectory may be made by the subject vehicle at a relatively low velocity to escape earth's atmosphere. Once in space, the vehicle can accelerate to the desired velocity. Since the descent profile is the opposite of the ascent profile, reentry into the atmosphere may be made at a relatively low velocity negating the need for a heat shield to protect the vehicle from friction (reentry) heating. Since the earth rotates at roughly 1000 miles per hour, the vehicle will match this velocity and then vertically descend.

Figure 6:
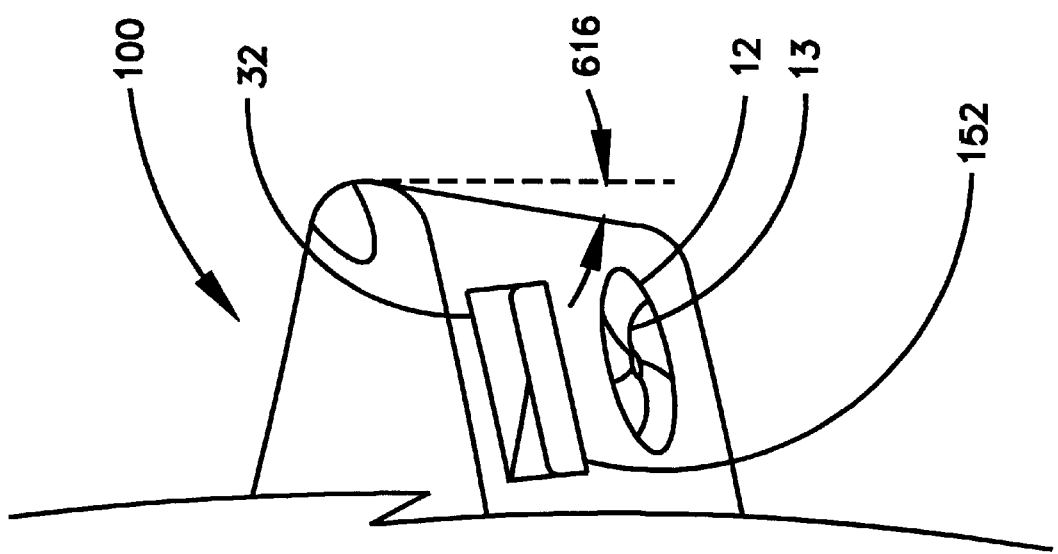
FIG. 6 is a perspective view of an embodiment of a vehicle beveled leading edge showing an air inlet.

During atmospheric flight, the air intakes 30 and 32 allow air into the air accumulator curved sphenoid 40. Since horizontal and vertical descent motions cause a decrease in airflow into the top air intakes, side air intakes 32 are provided. FIG. 6 is a perspective view of the leading edge of the vehicle 100 showing an inward bevel 616 where the side air intakes 32 are located around the vehicle's outer perimeter. This bevel is to better facilitate airflow into the air intakes 32 while in vertical descents.

Figure 7:
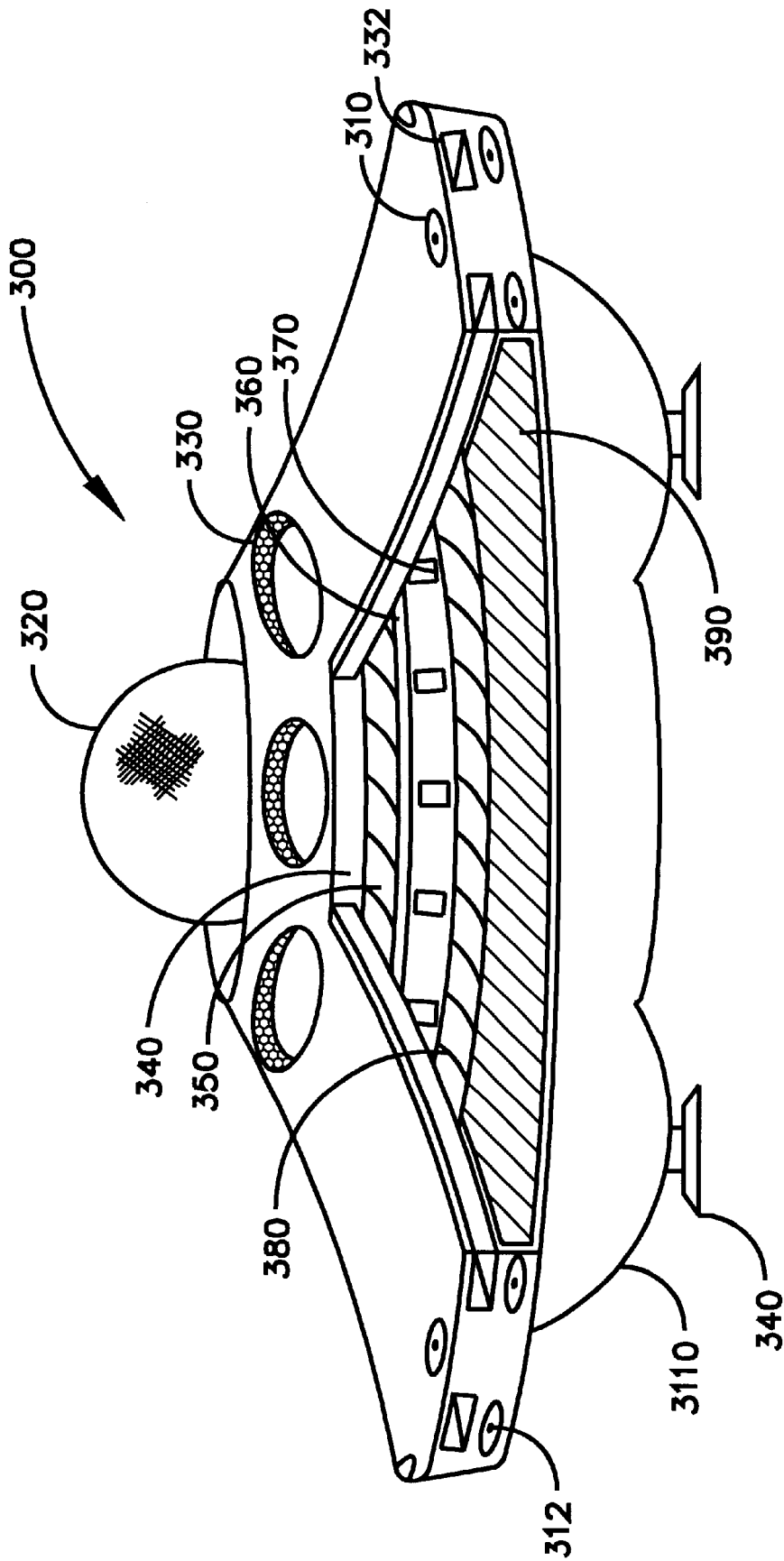
FIG. 7 is a perspective view of an embodiment of a vehicle suitable for atmospheric flight.

FIG. 7 is a perspective view of another embodiment of a progressive 3-axis multi-variable propulsion vectoring aerial vehicle 300 suitable for atmospheric flight. In this configuration, the vehicle 100 has the components of the air breathing portion of the propulsion system used in the embodiment shown in FIG. 1. Air enters the vehicle through air intakes 330 and 332 (doors not shown for simplicity), and accumulates in the curved accumulator sphenoid 340. The air is compressed by the compressor section 350 and allowed to achieve optimum compression in the diffuser 360. The high pressure air is mixed with fuel supplied from the fuel tank 3110 and ignited in the fuel burner cans 370. The fuel can be any type of fuel used in air breathing engines, such as jet fuel, kerosene, gasoline, among other. The heated high pressure gas expands through turbine section 380. The hot expanding gasses enter the gas plenum 390. The gas plenum 90 directs the hot gas to the exhaust ports 310, 312, and 314.

Figure 8:
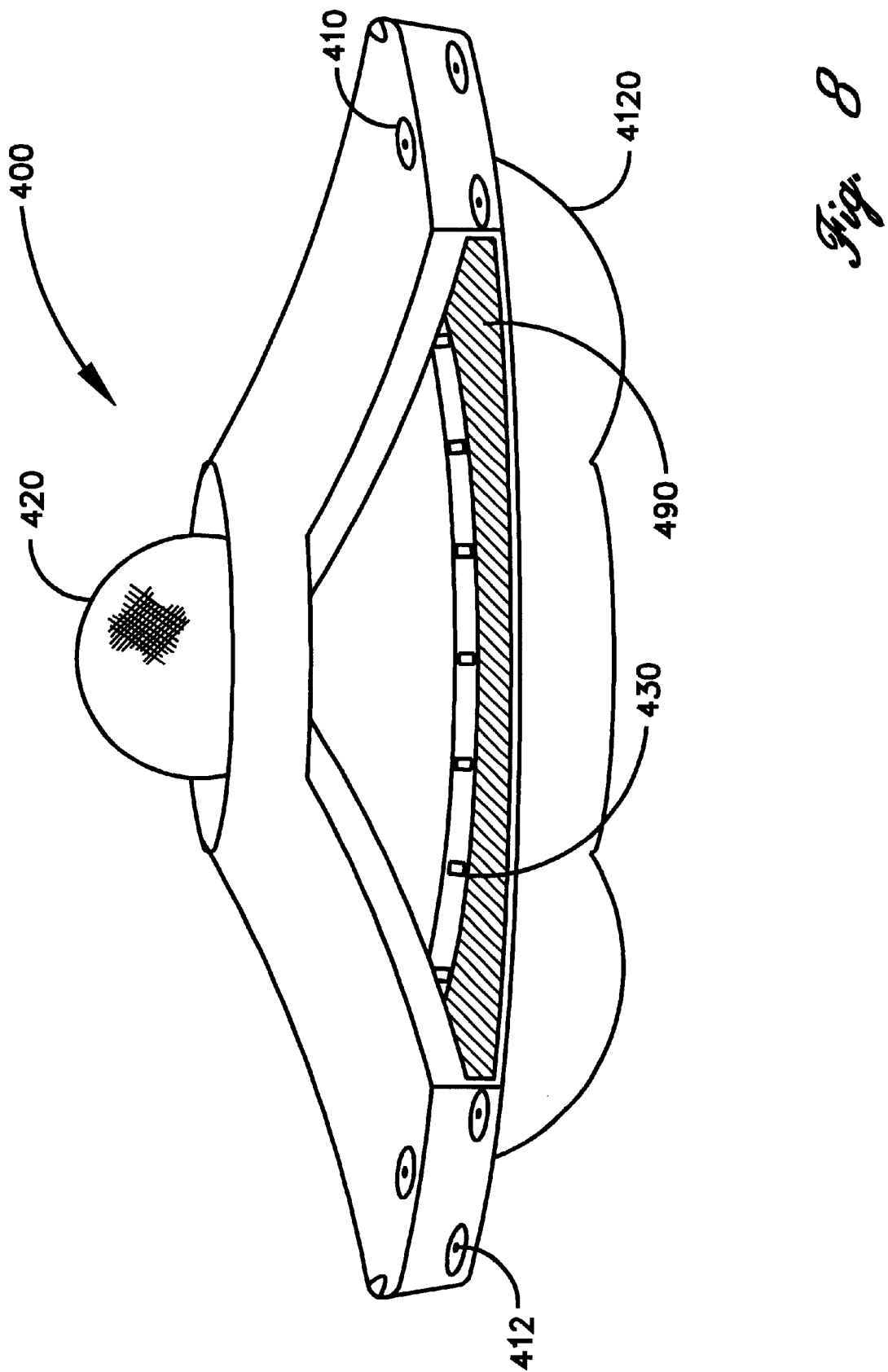
FIG. 8 is a perspective view of an embodiment of a vehicle suitable for space flight.

FIG. 8 is a perspective view of another embodiment of a progressive 3-axis multi-variable propulsion vectoring aerial vehicle suitable for space flight. The propellant burner cans 430 are ignited with propellant supplied from propellant tank. The fuel-oxidizer propellant may be any propellant that is used in a space environment, such as hydrogen-oxygen, hydrazine, aerozine, among others. The propellant is throttled through the propellant burner cans 430, combustion takes place, producing high pressure gas in the gas plenum 490. Flight control is maintained by the computer controlling the selective opening and closing of top, side and bottom (not shown) exhaust ports 410, 412, based on the desired flight course.

One embodiment of the on-board flight control computer system is shown in the flow-chart presented in FIG. 13. A course change command is communicated to the computer for a particular course as represented by block 1310. The flight control computer has an extensive database of pre-programmed control parameters which control the opening and closing of exhaust ports for any course change that the pilot may want to implement. These flight parameters may be determined by analyzing the vehicle's performance using computational analysis, wind tunnel testing and flight testing.

The flight control computer will select the appropriate pre-programmed control parameters represented by block 1320. This will provide a significant portion of the control needed for the course change. Adjustments are made to the pre-programmed control parameters to compensate for real-time conditions, by a sensor means represented by block 1330. The sensor means may consist of instruments, such as ring laser gyroscopes or global positioning receivers, to detect the actual flight path. A feed-back control loop from the sensor means to the pre-programmed flight control parameters database results in the fine controls needed for vehicle course changes. This feed-back control loop will remain continual until the next commanded course change, represented by block 1350.

The progressive 3-axis multi-variable propulsion vectoring aerial vehicle suitable for atmospheric flight has spinning components, namely the compressor section and the turbine section. Vehicles comprising spinning components have inherent gyroscopic forces imparted on the vehicle structure. Large gyroscopic forces resist any tendency for the vehicle to change the direction of the spinning axis. These forces may interfere with maneuverability as well as require the propulsion system to overcome the tendency for the vehicle to spin. In one embodiment, the gyroscopic forces may be minimized by incorporating a twin spool system for the compressor and turbine. In this case, the compressor and turbine of one spool will counter-rotate with the compressor and turbine of the other spool essentially counteracting the gyroscopic effects of each spinning component. In another embodiment, the turbine is on one spool and the compressor is on the other. The flight control computer can compensate for any remaining gyroscopic effects by controlling the exhaust ports.

In another embodiment, the propulsion system is sized to allow the flight control computer to overcome the gyroscopic forces. Additionally, in another embodiment with a vertically-mounted engine, the flight control computer controls the vehicle such that the vehicle retains a vertical attitude throughout any flight condition. In another embodiment, additional exhaust ports may be preferentially placed around the vehicle at a cant angle in the opposing direction to the gyroscopic effect. The exhaust port doors would be controlled based on engine speed to effectively control and counteract the rotation moment caused by the gyroscopic effect of the spinning engine components.

The progressive 3-axis multi-variable propulsion vectoring aerial vehicle has the ability for rapid, almost instantaneous, course changes, producing very high G-forces. Maneuverability is typically limited in an aircraft such that the pilot will remain conscious at all times. Methods and apparatus, such as those presented in U.S. Pat. No. 5,979,827, Progressive G-Force Alignment Platform for High Performance Aerial and Spaceborne Vehicles, allow the pilot to withstand much higher G-forces than previously allowed.

Figure 9:
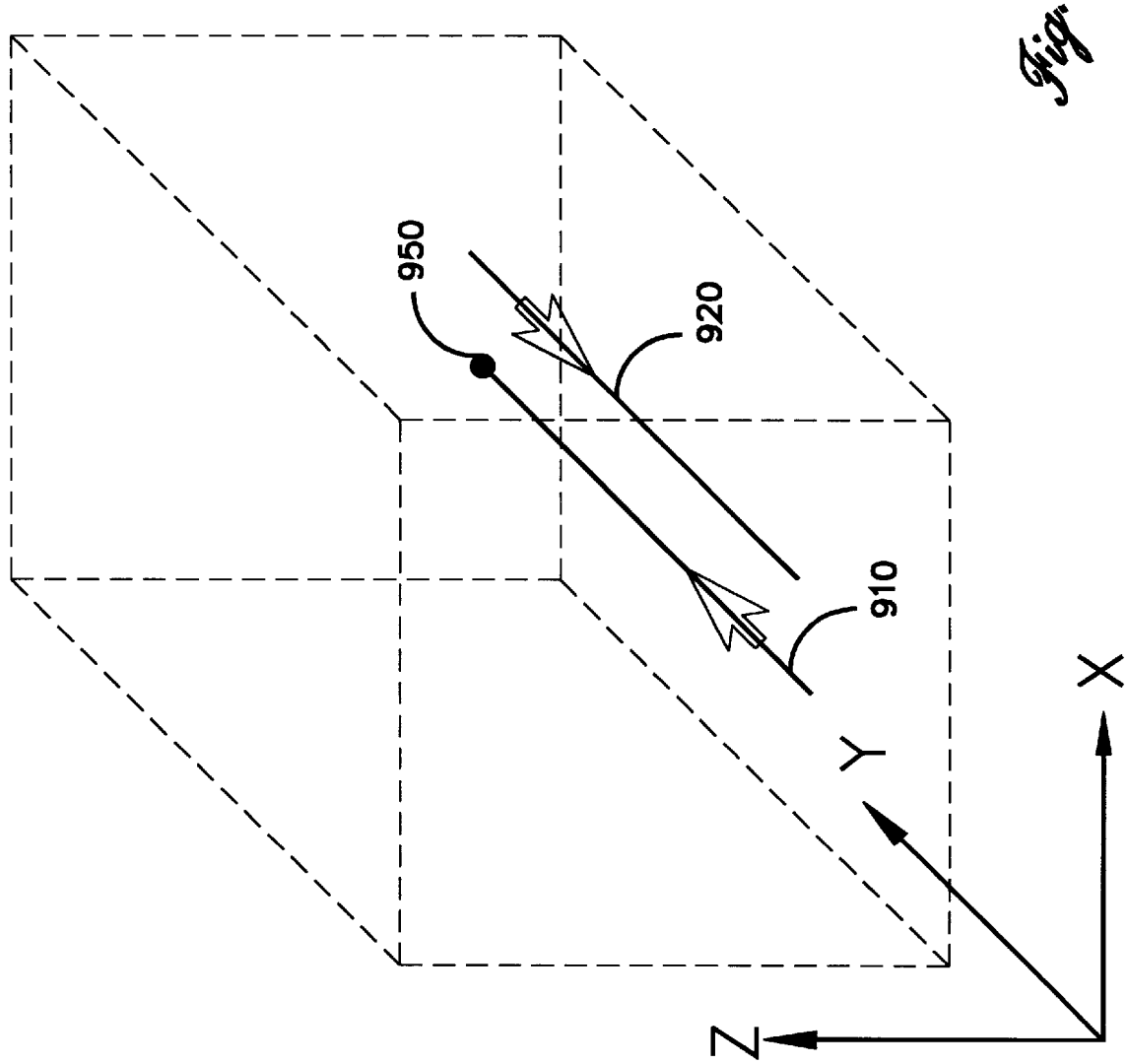
FIG. 9 is a schematic view of a 180 degree course reversal maneuver.

The following are examples of possible flight profiles of the vehicle, equipped with the progressive G-force alignment platform presented in U.S. Pat. No. 5,979,827, and how each system interacts to perform the maneuver. FIG. 9 shows a flight path represented in three-dimensions space defined by coordinate axis X, Y, Z. The pilot commands a course vector 910. At the point of course reversal 950, the pilot commands a 180 degree course reversal. The progressive G-force alignment platform adjusts the pilot for the intended G-force while also taking into account the new commanded course vector for changing the propulsion direction to the new command course vector. As the pilot is being positioned for the new course vector 920, the onboard flight control computer commands the exhaust ports to achieve the desired course direction. The vehicle's flight dynamics will be very rapid deceleration and acceleration in the opposite direction.

Figure 10:
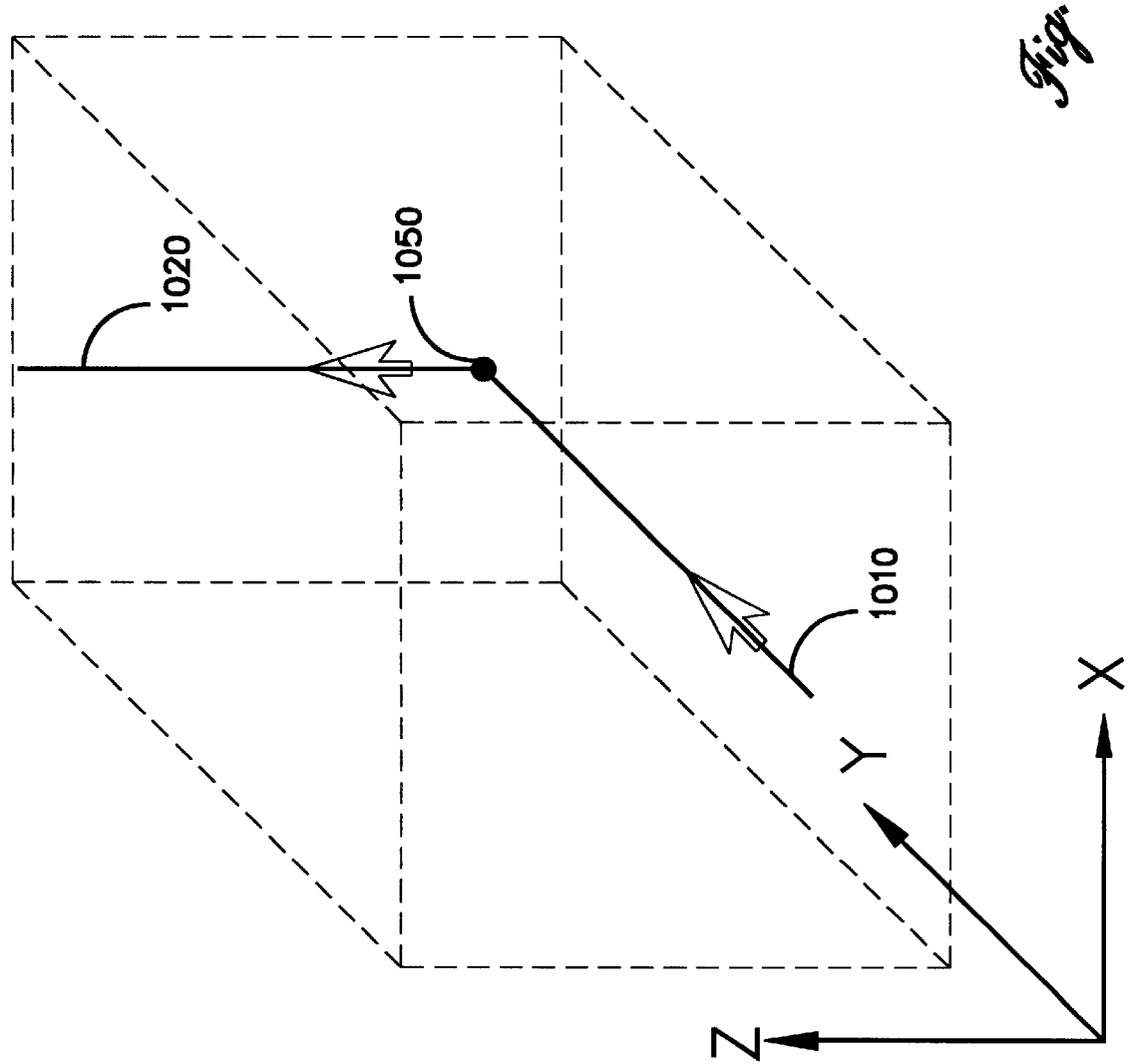
FIG. 10 is a schematic view of a transition from horizontal to vertical flight maneuver.

FIG. 10 shows a flight path represented in three-dimensions space defined by coordinate axis X, Y, Z. The pilot commands a course vector 1010. At the point of course change 1050, the pilot commands a vertical climb. The progressive G-force alignment platform adjusts the pilot for the intended G-force while also taking into account the new commanded course vector for changing the propulsion direction to the new commanded course vector. As the pilot is being positioned for the new course vector 1020, the onboard flight control computer commands the exhaust ports to achieve the desired course direction.

Figure 11:
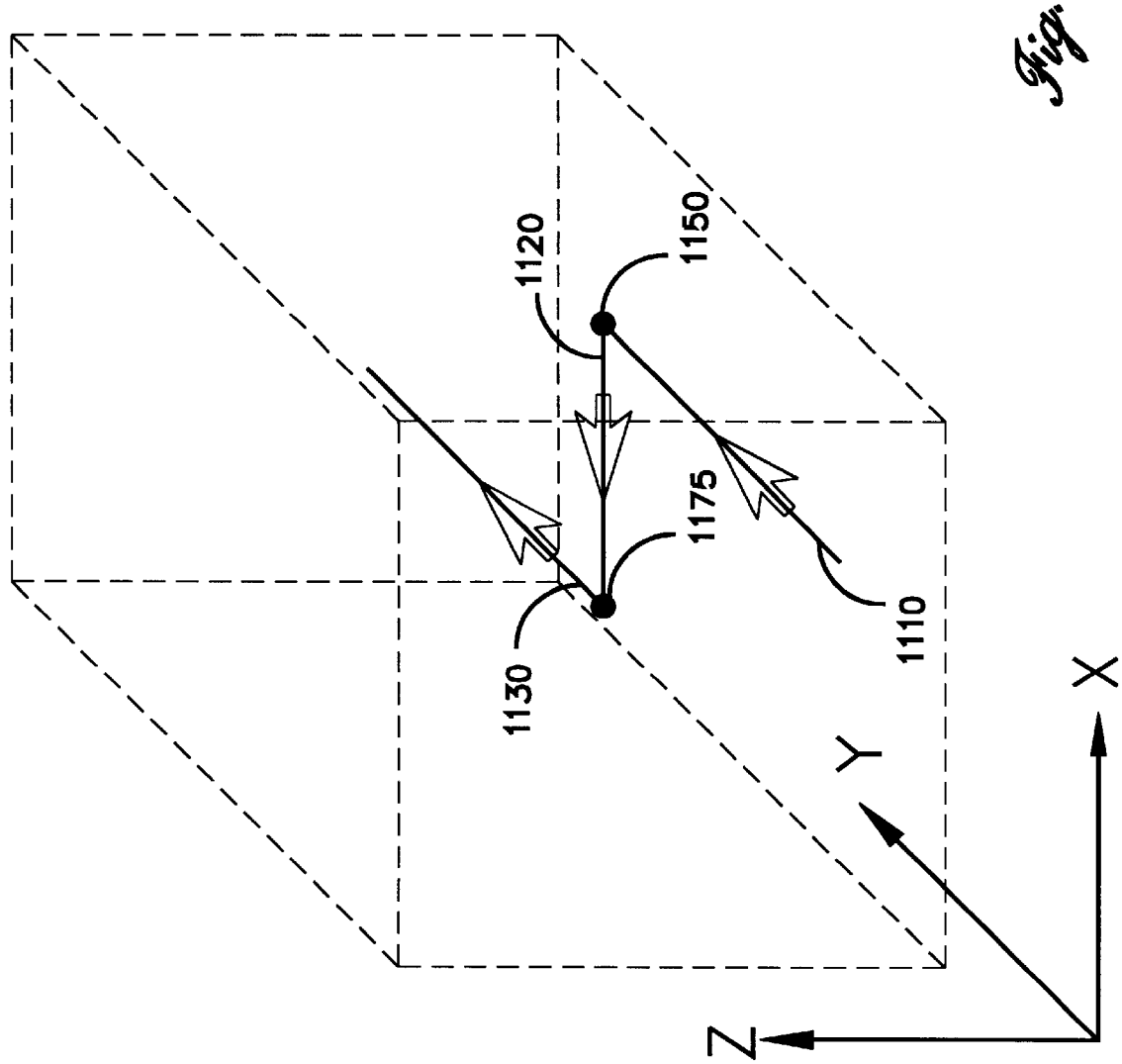
FIG. 11 is a schematic view of a zig-zag maneuver to the left.
Figure 12:
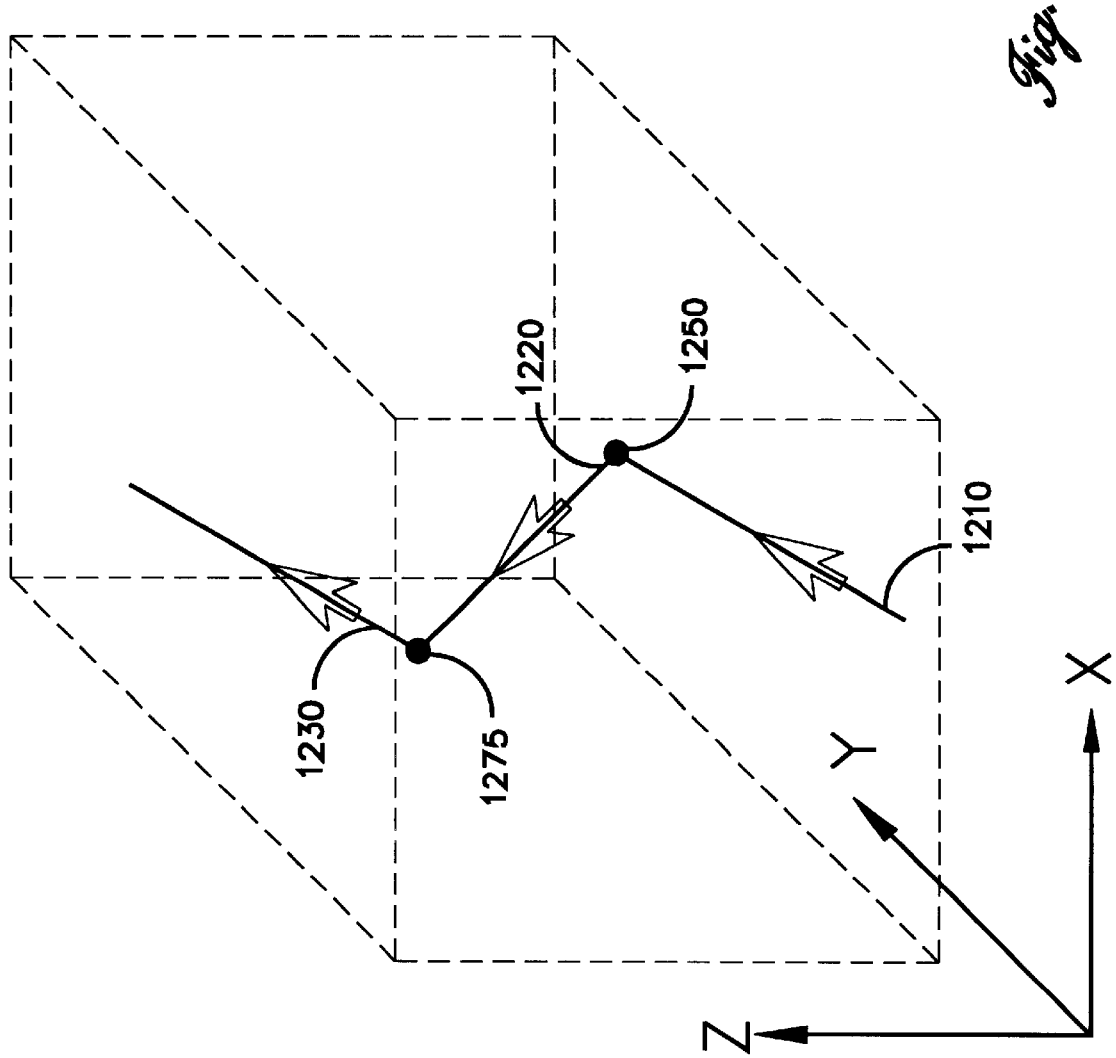
FIG. 12 is a schematic view of a combination climb and zig-zag maneuver to the left.

FIGS. 11 and 12 show flight paths represented in three-dimensions space defined by coordinate axis X, Y, Z. FIG. 11 is a flight path which will take the vehicle in a 90-degree horizontal zig-zag trajectory. FIG. 12 is a flight path which will take the vehicle in a climbing 60-degree zig-zag trajectory. It is to be emphasized that the unique characteristics of the vehicle provides for nearly instantaneous course changes. Due to the high G-forces, a system such as the progressive G-force alignment platform, such as that provided in U.S. Pat. No. 5,979,827 is required for these high-G maneuvers if the vehicle is manned.

It is understood that fuel capacity of any aircraft/spacecraft can be a limiting factor for a particular flight profile. Therefore, it is understood that in-flight refueling techniques may be performed to allow a longer flight duration. One embodiment of an in-flight refueling procedure comprises tanker vehicles carrying a supply of fuel positioned at various altitudes along the flight path of a vehicle requiring refueling. As the vehicle reaches each tanker, in-flight refueling takes place through a docking boom allowing the transfer of fuel from the tanker to the target vehicle. Through such a procedure, the range of the target vehicle can be greatly extended.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A vehicle adapted for flight, comprising:

an airframe comprising a top, side, and bottom;

at least one top exhaust port on the airframe top;

at least one side exhaust port on the airframe side;

at least one bottom exhaust port on the airframe bottom, the top, side and bottom exhaust ports each comprising a door;

a gas plenum in fluid communication with the exhaust ports;

a gas plenum door;

at least one air intake located on the airframe, the at least one air intake comprising a door;

a fuel-burning gas-generating means adapted to produce gas, the fuel-burning gas-generating means in fluid communication with the at least one air intake; and a propellant-burning gas-generating means adapted to produce gas, the propellant-burning gas-generating means in fluid communication with both the fuel-burning gas-generating means and the gas plenum, the gas plenum door disposed between the fuel-burning gas-generating means and the propellant-burning gas-generating means, the gas plenum door adapted to control the fluid communication between the fuel-burning gas-generating means and the propellant-burning gas-generating means, wherein the gas is distributed within the gas plenum to the exhaust ports, wherein the thrust required for horizontal and vertical flight is obtained by the controlled flow of the gas out of at least one exhaust port.

2. A vehicle adapted for flight according to claim 1, wherein the airframe is in the shape of a disk.

3. A vehicle adapted for flight according to claim 1, wherein the fuel-burning gas-generating means comprises:

an air accumulator in fluid communication with the at least one air intake;

a compressor section comprising a plurality of compressor blades, the compressor section in fluid communication with the air accumulator;

at least one fuel burner can in fluid communication with the compressor section;

a turbine section comprising a plurality of turbine blades, the turbine section in fluid communication with the fuel burner can, the turbine section in fluid communication with the propellant-burning gas-generating means; and a fuel tank in fluid communication with the fuel burner can, wherein the gas is produced by igniting fuel in the fuel burner can.

4. A vehicle adapted for flight according to claim 3, wherein the fuel tank supplies jet fuel.

5. A vehicle adapted for flight according to claim 1, wherein the propellant-burning gas-generating means comprises:

at least one propellant burner can in fluid communication with the fuel-burning gas-generating means and with the gas plenum; and a propellant tank in fluid communication with the at least one propellant burner can, wherein the gas is produced by igniting propellant in the propellant burner can.

6. A vehicle adapted for flight according to claim 5, wherein the propellant is hydrazine.

7. A vehicle adapted for flight according to claim 5, wherein the propellant is hydrogen and oxygen.

8. A vehicle adapted for flight according to claim 1, wherein the fuel-burning gas-generating means comprises:

an air accumulator in fluid communication with the at least one air in take;

a compressor section comprising a plurality of compressor blades, the compressor section in fluid communication with the air accumulator;

at least one fuel burner can in fluid communication with the compressor section;

a turbine section comprising a plurality of turbine blades, the turbine section in fluid communication with the fuel burner can, the gas plenum in fluid communication with the turbine section; and a fuel tank in fluid communication with the at least one fuel burner can; and wherein the propellant-burning gas-generating means comprises:

a propellant tank; and at least one propellant burner can in fluid communication with the propellant tank, the at least one propellant burner can in fluid communication with the gas plenum, the gas plenum door disposed between the turbine section and the gas plenum such that when closed the turbine section is substantially sealed off from the gas plenum.

9. A vehicle adapted for flight comprising:

an airframe comprising a top, side, and bottom;

at least one top exhaust port on the airframe top;

at least one side exhaust port on the airframe side;

at least one bottom exhaust port on the airframe bottom;

at least one air intake located on the airframe side, the airframe side being beveled at an angle down from horizontal;

a gas plenum in fluid communication with the exhaust ports;

the exhaust ports each comprising, a door;

a gas-generating means comprising:
- an air accumulator in fluid communication with the at least one air intake;
- a compressor section comprising a plurality of compressor blades, the compressor section in fluid communication with the air accumulator;
- at least one fuel burner can in fluid communication with the compressor section;
- a turbine section comprising a plurality of turbine blades, the turbine section in fluid communication with the fuel burner can, the gas plenum in fluid communication with the turbine section; and a fuel tank in fluid communication with the at least one fuel burner can.

10. A vehicle adapted for flight comprising:

an airframe comprising a top, side, and bottom;

at least one top exhaust port on the airframe top;

at least one side exhaust port on the airframe side;

at least one bottom exhaust port on the airframe bottom;

the exhaust ports each comprising a door;

a gas plenum in fluid communication with the exhaust ports;

a gas-generating means comprising:
- a propellant tank; and
- at least one propellant burner can in fluid communication with the propellant tank, the at least one propellant burner can in fluid communication with the gas plenum.

11. A vehicle adapted for flight according to claim 1, wherein the airframe further comprises a progressive G-force alignment platform.

12. A vehicle adapted for flight according to claim 1, wherein the airframe comprises an oval shape.

13. A vehicle adapted for flight according to claim 1, wherein the airframe has landing gear.

14. A vehicle adapted for flight according to claim 8, wherein the fuel is jet fuel and the propellant comprises hydrazine.

15. A vehicle adapted for flight according to claim 9, wherein the fuel is jet fuel.

16. A vehicle adapted for flight according to claim 5, wherein the propellant comprises fuel and oxidizer.

17. A vehicle adapted for flight according to claim 5, wherein the propellant is hydrazine.

18. A method for controlling a vehicle adapted for flight, the vehicle comprising:
- a flight control computer comprising a database of preprogrammed control parameters;
- at least one vehicle position sensor in electrical communication with the flight control computer;
- an airframe comprising:
  - a top, side, and bottom; and
  - at least one top exhaust port on the airframe top, at least one side exhaust port on the airframe side, and at least one bottom exhaust port on the airframe bottom, the exhaust ports each comprising a door; and
- a supply of gas distributed to the at least one top, side and bottom exhaust port, wherein the thrust required for horizontal and vertical flight is obtained by the controlled flow of gas out of one or more exhaust ports, the flight control computer in electrical communication with the exhaust port doors;

the method comprising:
- communicating a course change command to the flight control computer wherein the flight control computer chooses from the database of preprogrammed control parameters based on the course change command to affect the course change by selectively opening and closing at least one exhaust port door;
- sensing the vehicle position with the at least one position sensor;
- communicating the position data to the flight control computer; and
- processing the position data with the flight control computer such that the flight control computer may choose the appropriate preprogrammed control parameters to affect the course change, wherein the fight control computer and the at least one position sensor are in a continual feed-back loop.

19. A vehicle adapted for flight, comprising:

an airframe comprising a top, side, and bottom;

at least one top exhaust port on the airframe top;

at least one side exhaust port on the airframe side;

at least one bottom exhaust port on the airframe bottom;

a supply of gas distributed within the airframe to the at least one top, side and bottom exhaust ports, wherein the thrust required for horizontal and vertical flight is obtained by the controlled flow of gas out of at least one exhaust port;

at least one air intake located on the airframe, the at least one air intake comprising a door;

each exhaust port having an exhaust port door;

an air accumulator in fluid communication with the at least one air intake;

a gas-generating means within the airframe comprising:
- a compressor section comprising a plurality of compressor blades, the compressor section in fluid communication with the air accumulator;
- at least one fuel burner can in fluid communication with the compressor section;
- a turbine section comprising a plurality of turbine blades, the turbine section in fluid communication with the burner can;
- a gas plenum in fluid communication with the turbine section, the exhaust ports in fluid communication with the gas plenum;
- a fuel tank in fluid communication with the at least one fuel burner can;

a propellant tank;
- at least one propellant burner can in fluid communication with the propellant tank, the at least one propellant burner can in fluid communication with the gas plenum;

a gas plenum door between the turbine section and the gas plenum such that when closed the turbine section is substantially sealed off from the gas plenum; and an onboard flight control computer, such that the flight control computer controls the opening of the exhaust port doors.

20. A vehicle adapted for flight according to claim 1, wherein the airframe side is beveled at an angle down from horizontal, at least one of the air intakes located on the airframe side.

21. A vehicle adapted for flight according to claim 1, wherein the at least one top, side and bottom exhaust port doors are adapted to be operated independently, in any combination with each other, and in any range between fully open and fully closed.

22. A vehicle adapted for flight according to claim 3, further comprising at least one exhaust port preferentially placed at a cant angle in an opposing direction to a gyroscopic effect.

23. A vehicle adapted for flight according to claim 9, wherein the at least one top, side and bottom exhaust port doors are adapted to be operated independently, in any combination with each other, and in any range between fully open and fully closed.

24. A vehicle adapted for flight according to claim 19, wherein the airframe side is beveled at an angle down from horizontal, at least one of the air intakes located on the airframe side.

25. A vehicle adapted for flight according to claim 19, wherein the at least one top, side and bottom exhaust port doors are adapted to be operated independently, in any combination with each other, and in any range between fully open and fully closed.

26. A vehicle adapted for flight according to claim 19, wherein the airframe is in the shape of a disk.

27. A vehicle adapted for flight according to claim 19, wherein the fuel tank supplies jet fuel.

28. A vehicle adapted for flight according to claim 19, wherein the propellant comprises fuel and oxidizer.

29. A vehicle adapted for flight according to claim 19, further comprising at least one exhaust port preferentially placed at a cant angle in an opposing direction to a gyroscopic effect.

30. A vehicle adapted for flight according to claim 19, wherein the airframe further comprises a progressive G-force alignment platform.

31. A vehicle adapted for flight according to claim 19, further comprising:
    a flight control computer comprising a database of preprogrammed control parameters; and
    at least one vehicle position sensor in electrical communication with the flight control computer, the position sensor adapted to communicate position data to the flight control computer, the fight control computer and the at least one position sensor in a continual feed-back loop, the flight control computer adapted to accept a course change command and choose from the database the appropriate preprogrammed control parameters based on the course change command to affect the course change by selectively opening and closing at least one exhaust port door.

32. A vehicle adapted for flight, comprising:
    an airframe comprising a plurality of exhaust ports on a top, a plurality of exhaust ports on a side, and a plurality of exhaust ports on a bottom;
    at least one of said exhaust ports on each of the airframe top, side and bottom, said exhaust ports each comprising a door adapted to be operated independently, in any combination with each other, and in any range between fully open and fully closed; and
    a supply of gas distributed to the exhaust ports, wherein the thrust required for horizontal and vertical flight is obtained by the controlled flow of the gas out of the exhaust ports.

33. A vehicle adapted for flight according to claim 32, further comprising:
    a gas plenum, the gas plenum in fluid communication with the exhaust ports;
    a gas plenum door;
    at least one air intake located on the airframe, the at least one air intake comprising a door;
    a fuel-burning gas-generating means adapted to produce gas, the fuel-burning gas-generating means in fluid communication with the at least one air intake; and
    a propellant-burning gas-generating means adapted to produce gas, the propellant-burning gas-generating means in fluid communication with both the fuel-burning gas-generating means and the gas plenum, the gas plenum door disposed between the fuel-burning gas-generating means and the propellant-burning gas-generating means, the gas plenum door adapted to control the fluid communication between the fuel-burning gas-generating means and the propellant-burning gas-generating means.

34. A vehicle adapted for flight according to claim 32, wherein the airframe side is beveled towards the airframe bottom, at least one of the air intakes is located on the airframe side and points at an angle down from horizontal.

35. A vehicle adapted for flight according to claim 32, further comprising:
    a gas plenum in fluid communication with the exhaust ports, wherein the gas-generating means comprises:
        a propellant tank; and
        at least one propellant burner can in fluid communication with the propellant tank and the gas plenum.

36. A vehicle adapted for flight according to claim 32, further comprising:
    at least one air intake located on the airframe;
    an air accumulator in fluid communication with the at least one air intake;
    a gas plenum in fluid communication with the exhaust ports;
    the gas-generating means comprising:
        a compressor section comprising a plurality of compressor blades, the compressor section in fluid communication with the air accumulator;
        at least one fuel burner can in fluid communication with the compressor section;
        a turbine section comprising a plurality of turbine blades, the turbine section in fluid communication with the fuel burner can and the gas plenum; and
        a fuel tank in fluid communication with the at least one fuel burner can.

37. A vehicle adapted for flight according to claim 36, wherein the airframe side is beveled towards the airframe bottom, at least one of the air intakes is located on the airframe side and points at an angle down from horizontal.

* * * * *